Patented Mar. 23, 1926.

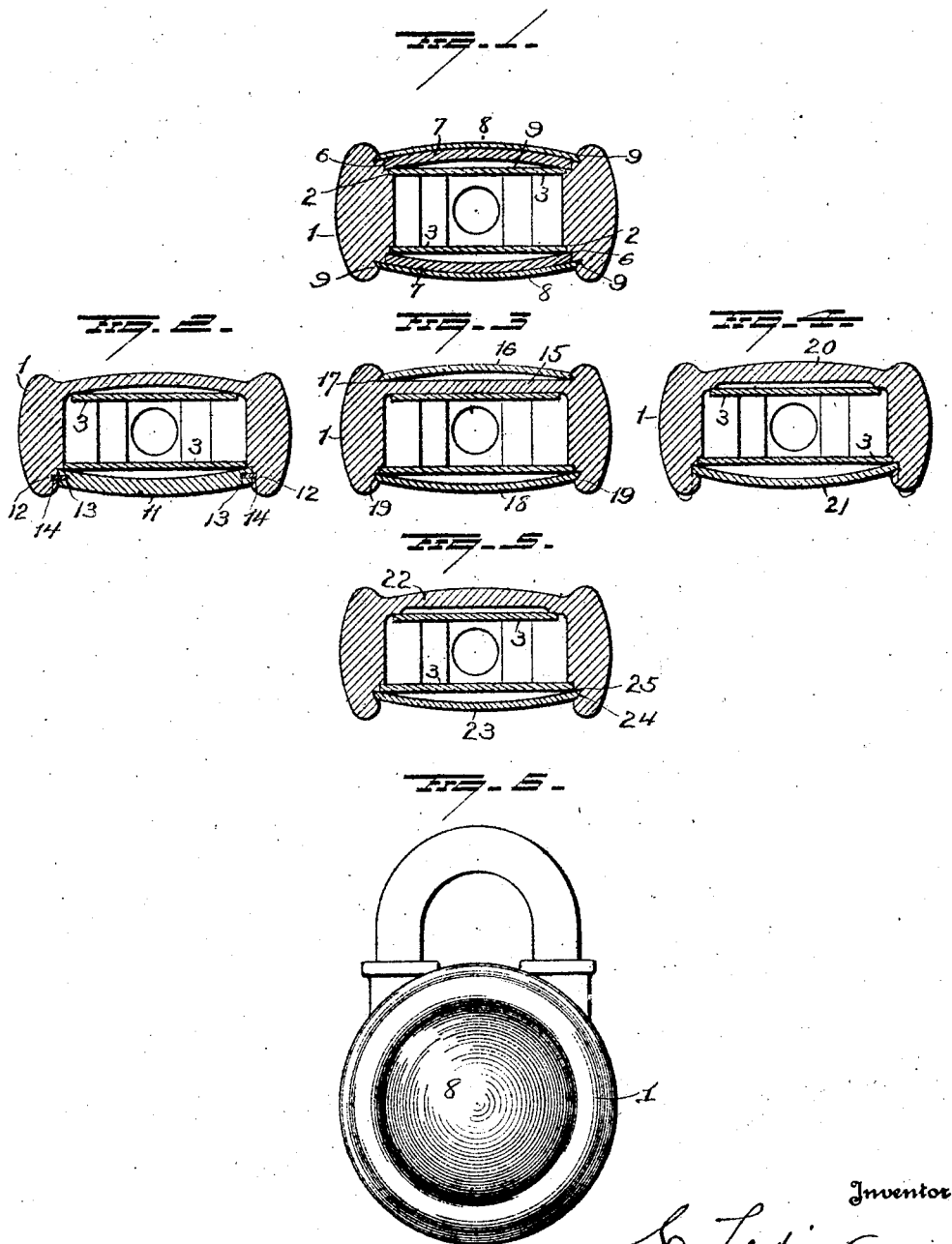

1,577,977

UNITED STATES PATENT OFFICE.

CHARLES LEDIN, OF STAMFORD, CONNECTICUT, ASSIGNOR TO THE YALE & TOWNE MANUFACTURING COMPANY, OF STAMFORD, CONNECTICUT.

PADLOCK.

Application filed June 23, 1924. Serial No. 721,805.

*To all whom it may concern:*

Be it known that I, CHARLES LEDIN, a citizen of the United States, and resident of Stamford, in the county of Fairfield and State of Connecticut, have invented certain new and useful Improvements in Padlocks; and I do hereby declare the following to be a full, clear, and exact description of the invention, such as will enable others skilled in the art to which it appertains to make and use the same.

This invention relates to improvements in padlocks,—one object of the invention being to construct the casing of a padlock in such manner that danger of driving out the lock mechanism and a casing closure by malicious pounding on a part of the casing opposite such casing closure, will be minimized.

With this and other objects in view, the invention consists in certain novel features of construction and combinations of parts as hereinafter set forth and pointed out in the claims.

In the accompanying drawings,—

Figure 1 is a transverse sectional view showing an armored casing and illustrating an embodiment of my invention, Figures 2, 3, 4 and 5 are sectional views showing modifications of the armored casing, and Figure 6 is a face view.

My improved padlock casing includes a casing member 1 which, in the present instance, is circular or annular and may be made of any suitable metal, such as malleable iron or bronze, for example. Both sides of the casing member 1 may be open as shown in Figure 1 and may be formed with seats 2 for the edge portions of the end plates 3—3 of a lock frame. The casing member 1 is also formed at each side with circular seats 6, offset from the circular frame-plate seats 2, for the accommodation of the peripheral portions of armor face plates 7—7 which will preferably be made of hardened steel and may be concavo-convex and caused to engage the frame plates 3. The armor plates may be held in place by means of veneer or finish plates 8—8, which latter cover the armor plates and may be secured to the casing member 1 by having their peripheral beveled portions sprung into undercut circular recesses or seats 9 in the casing member 1.

By armoring the casing as above described, danger of driving out the lock mechanism and a casing closure by malicious pounding on a part of the casing opposite such casing closure, will be reduced to a minimum.

Instead of providing armor closures for both sides of the casing, one side 10 of the casing may be made solid or integral with the circular casing member 1, and the closure for the other side of the casing may consist of an armor plate 11 held permanently in place by a split ring 12 inserted into a peripheral groove 13 in the armor plate and permitted to expand into a circular groove 14 in the casing member 1, as shown in Figure 2.

In Figure 3, the back 15 of the casing is made integral with the casing member 1 and may be flat and covered by a concavo-convex veneer or finish plate 16 having a beveled peripheral edge entering an undercut seat 17 in the casing member 1. In this construction, the opposite side of the casing is closed by an armor plate 18, the peripheral edge of which is beveled and enters a circular undercut groove or seat 19 in the casing member 1.

In the construction shown in Figure 4, one side 20 of the casing is made convex and integral with the casing member 1 and the other side of the casing is closed by a concavo-convex armor plate 21 which is seated at its peripheral portion in the casing member 1 and held in place by spinning or swaging the edge or rim of the latter down over the plate.

In the form shown in Figure 5, the side 22 is made integral with the casing member 1 as in the form shown in Figure 4 and the armor plate 23 for the other side of the casing is provided with a beveled edge 24 and swaged or expanded into a circular groove or seat 25 formed in the casing member 1.

Having fully described my invention what I claim as new and desire to secure by Letters-Patent, is:

1. The combination with the casing of a padlock, of means to prevent rupture or drilling of said casing to disturb the lock means therein, said first mentioned means consisting of a hardened steel armor on said casing and covering a side thereof, and means securing the edge portion of said armor to an outwardly projecting portion of the casing.

2. A padlock including a casing having an open side, a hardened steel armor plate seated in said casing and closing said open side, and a finish plate covering said hardened steel armor plate, said finish plate permanently secured to the casing and securing said hardened steel armor plate in place.

3. A padlock including an annular casing member, hardened steel armor plates seated in said casing member and closing respective sides of the casing, and finish plates covering the respective hardened steel armor plates and permanently secured to the casing member.

In testimony whereof, I have signed this specification.

CHARLES LEDIN.